United States Patent
Baker

[15] 3,685,492
[45] Aug. 22, 1972

[54] COW CONTROLLER
[72] Inventor: Wallace L. Baker, RFD #1 Box 166 A, Burley, Idaho 83318
[22] Filed: July 20, 1970
[21] Appl. No.: 56,407

Related U.S. Application Data

[63] Continuation-in-part of Ser. No. 719,175, April 5, 1968, Pat. No. 3,572,294.

[52] U.S. Cl. .................................. 119/27, 119/96
[51] Int. Cl. .................................. A01j 01/00
[58] Field of Search .................. 119/27, 96, 126

[56] References Cited

UNITED STATES PATENTS

| | | | |
|---|---|---|---|
| 546,999 | 10/1895 | Cunningham | 119/126 |
| 1,383,901 | 7/1921 | Blackburn | 119/126 |
| 1,754,752 | 4/1930 | Grim | 119/27 |
| 2,637,962 | 5/1953 | Reeve | 119/27 X |
| 2,660,982 | 12/1953 | Linton | 119/98 |
| 2,762,334 | 9/1956 | Allen | 119/126 |
| 3,572,294 | 3/1971 | Baker | 119/27 |

*Primary Examiner*—Hugh R. Chamblee
*Attorney*—Lowe and King

[57] ABSTRACT

A device and method wherein positive pressure is applied in the sway of the back of an animal to prevent arching of the back to thereby prevent kicking and sidewise movement of the animal. The pressure member, which may be a cable or chain, is curved and flexible as as to fit the contour of the back and so as to be horizontally or longitudinally flexible and positionable as desired. A spanning bar extending down along the sides of the animal positively fixes the ends of the pressure member against upward movement. A rigid pressure section is positioned substantially at the center of the flexible member to increase the pressure at the backbone relative to the sides of the back. The section may be spool shaped so as to engage the sides of the backbone. A spring is utilized to normally retain the pressure member in the raised or inoperative position and means is provided to maintain substantially the same effective spring force throughout the range of adjustable movement of the pressure member.

11 Claims, 4 Drawing Figures

PATENTED AUG 22 1972

3,685,492

INVENTOR,
WALLACE LEE BAKER
BY Lowe & King
ATTORNEYS

COW CONTROLLER

This application is a continuation-in-part application of my copending application entitled "Cow Controller," Ser. No. 719,175, filed Apr. 5, 1968, now U.S. Pat. No. 3,572,294.

The present invention relates to arrangements for restraining the movement of animals and improvements therein, and more particularly, to a method for controlling the movement of large animals, such as cows, so as to prevent them from kicking and swaying from side to side and an improved device for performing this method.

BACKGROUND OF THE INVENTION

In modern day dairy operations, it is imperative for a farm to be capable of handling a large number of cows in a minimum amount of space so as to be capable of taking full advantage of modern milking equipment. Heretofore, the milking operation with machines has been slowed by the operator having to spend time calming each cow as the milking machine is placed in operation on her. To explain, even the most cooperative cows are sometimes annoyed by the use of milking machines, especially as the udder is being washed and teat cups are being applied by the operator. When thus annoyed, the cow's natural reaction is to obstruct the operator and to attempt to remove the cups by raising her hind foot and kicking forwardly along the side where the operator and the milk transfer tubes are positioned. Furthermore, in any herd of cows there are always a few which are naturally temperamental or nervous and thus hard to control during their confinement in a stall for milking. In such a case, the cow will resist even more violently by attempting to turn and kick the operator directly or to sway to the side pinning the operator against the side of the stall. In these situations it would be desirable to have a means to positively but gently control the cow's movement during milking to allow the operator to move more quickly and, as an additional benefit, to allow inexperienced persons or small children to help without fear of being injured by the cow.

In my copending application, identified above, now U.S. Pat. No. 3,572,294, there is disclosed and claimed an apparatus for overcoming the above problem by effectively controlling large animals. While this device has proved highly effective, certain refinements have been made to bring about an improved structure, and the method associated with the device has been proven through use in many and varied field applications to be highly effective and perfectly safe, and thus these concepts form the inventive entity of the present application.

OBJECTIVES OF THE INVENTION

Accordingly, it is one object of the present invention to provide an improved apparatus and the basic method for positively and safely restraining kicking and sidewise movement of large animals, such as cows.

It is another object of the present invention to provide a controlling apparatus for animals that utilizes an improved flexible pressure member for more effective restraining action of the animal.

It is still another object of the present invention to provide an improved apparatus including spring means for lifting the pressure member to an inoperative position, which spring means has substantially the same effective spring constant throughout the range of movement of the pressure member.

BRIEF DESCRIPTION OF THE INVENTION

To briefly describe the improved apparatus and the basic method of the present invention, a pressure member is positioned in the sway of the back of a large animal with sufficient pressure to prevent the animal from raising her hind foot to kick or resist being washed or milked. This pressure member is curved to fit the outline of the cow's back, and in the improved embodiment is flexible, so as to apply a substantially even and thus gentling pressure across the full width thereof. The member is mounted for bodily pivotal movement about a horizontal axis for rapid movement toward and away from the back of the animal so that said member can be quickly engaged and disengaged by the operator. Depending support arm means carry the pressure member from a pivotal cross bar, which is substantially rigid to form a secure base for the assembly to resist the actions of the animal. To keep the pressure member normally out of the way so that the cow may be moved into and out of the stall without obstruction, a spring is provided for normally urging the member upwardly away from the animal to an inoperative position in the top of the stall. An adjustable holddown means is provided in opposition to the spring to fix the member in position to apply firm, nonresilient pressure to the animal whereby the member resists upward movement of the back of the animal but does not follow downwardly as the cow relaxes, thus assuring the desired gentling effect. The application of pressure by the pressure member is the only substantial pressure applied to the animal, which adds greatly to the gentling effect and assures against suffocation, as has been common in the past with side pressure devices, commonly known as "cattle cheeters."

The flexible member in the improved version of the apparatus may comprise a cable or chain. The ends of the flexible pressure member are attached to the ends of the rigid spanning bar so as to positively fix the same against upward movement and prevent the arching of the back of the animal. In order to insure sufficient discomfort to the cow to discourage raising her back, and thus kicking, while the pressure member is in operative position, the flexible pressure member is proved with a rigid section centrally located so as to positively bear on the backbone with increased pressure relative to the sides of the back. The pressure section may include a straight pipe section so as to bear only at the apex of the backbone, or alternatively, may be in the form of a spool with the annular ends of the spool engaging the sides of the backbone of the animal. However, utilizing the cable or chain alone has proved to be highly effective, since the pressure is localized in the region defined by the narrow width of said cable or chain to apply the requisite discomfort or distress.

The flexible member may be positioned at the desired location along the back by the operator for the most effective control. After the flexible member is positioned in the sway of the back (below a plane between the hips and the shoulders) it tends to remain fixed with respect to the animal's back in the horizontal or longitudinal direction thereby preventing the animal from possibly slipping the same over the shoulders or hips by backing up or moving forward.

The spanning bar is extended down along the sides of the animal sufficiently to insure that the flexible pressure bar applies pressure along the sides of the animal to prevent side-to-side swaying of the cow. This is important for safety to prevent the cow from shifting position and attempting to force the operator against the side of the stall.

The improved spring means is preferably mounted in juxtaposition to the cross bar on the top of the restraining device so as to be in an out-of-the-way position. The spring is compact in size and has a relatively high spring constant so as to insure effective counterbalancing of the pressure member assembly to the inoperative position. In accordance with the invention, flexible connecting means is provided between the spring and a radially extending lever mounted on the pivoting cross bar of the device. In the inoperative position, the connecting means is spaced from the periphery of the cross bar. As the pressure member is brought down into engagement with the back of the animal through the adjustable means, the cross bar is rotated and the flexible means is progressively brought into engagement with the periphery of said cross bar. This progressive inward movement toward the center of rotation reduces the effective lever arm pulling on the spring as the spring force is increased due to compression. Thus, there results a structure wherein no substantial increase in the force is needed for positioning the pressure member in the lower operative position.

The spring means may be made adjustable by a threaded shaft and nut combination on the flexible connecting means. Preferably, the spring is a compression spring so that the connecting and adjusting means may be positioned within the confines of the spring.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

DETAILED DESCRIPTION OF THE INVENTION

Figure 1:
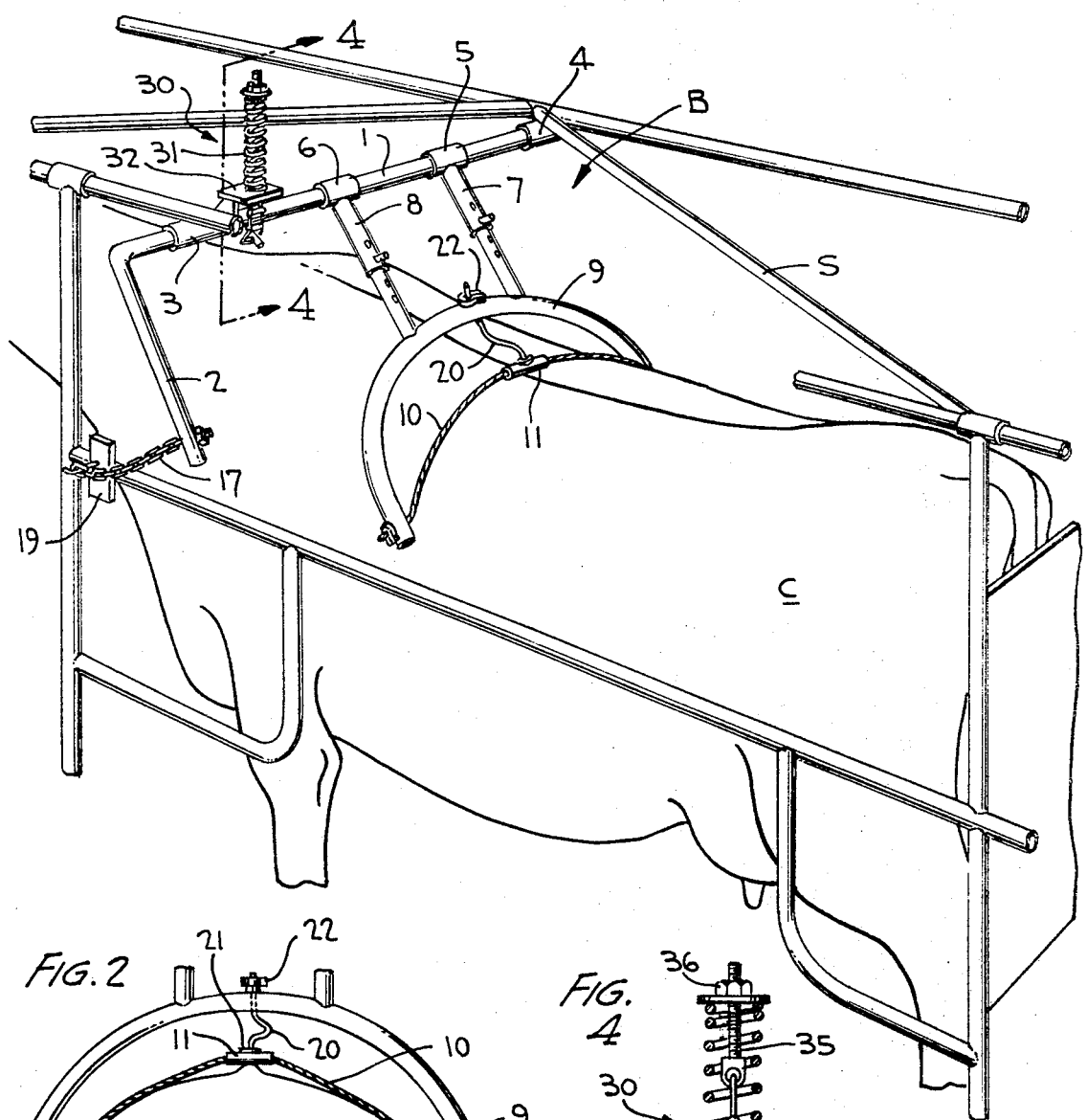
FIG. 1 is a perspective view of an animal controlling device, constructed in accordance with the teachings of the present improved apparatus and basic method of the invention, mounted in an exemplary working environment.

With reference now to the perspective view of FIG. 1 of the drawings, a pressure member assembly B is shown mounted on a conventional stall structure S in which is positioned a cow C in operative relationship thereto. It should be pointed out that while the pressure member assembly B and the method of control of the present invention is particularly adapted for use to control cows during the milking operation, other uses, such as controlling horses or the like, are well within the purview of the invention intended.

As shown, the pressure member assembly B comprises a pivotal cross bar 1 mounted along a horizontal axis with depending control arm 2 at one end thereof positioned so as to extend outside the confines of the stall S. The cross bar 1, as well as the control arm 2 and other parts of the assembly B are preferably made of strong steel tubing to provide the necessary rigidity thereto. However, it is to be understood that other materials of equal strength could be substituted if desired. The control arm 2 swings in an arc to adjust the angular position of the cross bar 1. The cross bar 1 is mounted on the stall S for pivotal action by means of a pair of sleeves 3, 4.

Positioned inboard of the sleeves 3, 4 on the support bar 1 is an additional pair of sleeves 5, 6 which are fixedly secured thereto. Suitably welded to these sleeves 5, 6 and positioned so as to depend downwardly therefrom is a pair of support arms 7, 8. A curved spanning bar 9 is carried by the lower end of the support arms 7, 8 so as to be positioned above the back of the cow C, as shown in FIG. 1. The ends of the spanning bar 9 extend down the sides of the cow and the spacing at all points along the bar 9 and the back of the cow is designed to be substantially equal.

Attached in a suitable fashion to the ends of the spanning bar 9 is a flexible pressure member or cable 10 adapted to engage the sway of the back of the cow C, that is, below the plane extending from the hips to the shoulders, and to conform to the contour of the back. The flexibility of the cable thus insures a proper fit for any size or breed of animal that is desired to be controlled within the stall S.

The cable 10 may be positioned by the operator as it is brought down in a small range of longitudinal positions along the sway of the back for selection of the most favorable control position. Also, if the animal attempts to move longitudinally, the cable 10 is capable of horizontal flexure so as to remain stationary at the selected control position. This hinders any attempt of the animal to slip the cable 10 in the horizontal direction over the shoulders or the hips by forward or rearward movement in the stall S.

As shown in FIG. 1, the spanning bar 9 is fixed to the support arms 7, 8 at an acute angle $\theta$ so that when the pressure member or cable 10 is moved to the operative position, the spanning bar 9 will be in a plane perpendicular to the back of the cow C. This arrangement further insures proper fit of the cow C within the pressure member or cable 10 and the proper fixing of its ends so as to prevent upward movement with respect to the cow C thereby providing maximum controlling effectiveness (see FIG. 2).

An important feature of the flexible member 10 is the provision of a flat or noncurved length or section of rigid pipe 11 at the center thereof. As shown in FIG. 1, this section of pipe 11 is thus arranged so as to be disposed directly over the backbone of the cow. This section 11 thus insures that the backbone is engaged by the pressure member 10 regardless of the particular shape of the back of the cow C and is effective to apply the increased pressure and discomfort relative to the sides of the back of the cow C that will prevent her from raising the back the slight amount required for her to lift of the hind leg for kicking. In other words, this section 11 in all cases insures engagement and increased pressure between the flexible member 10 and the cow C at this critical point even if other portions of the pressure member 10 do not exactly fit the contour of the back of the particular cow C being restrained. This can be seen in FIG. 2 wherein the lower end of the flexible member 10 is shown slightly spaced away from the side of the cow C so that wider animals than the particular cow C shown could be accommodated.

The final positioning of the pressure member or cable 10 is effected through the control arm 2 by an adjustable chain holddown 17 (see FIG. 1). As is apparent, the adjustment is gained by the free end of the chain being attached to a suitable hook assembly 19.

Figure 2:
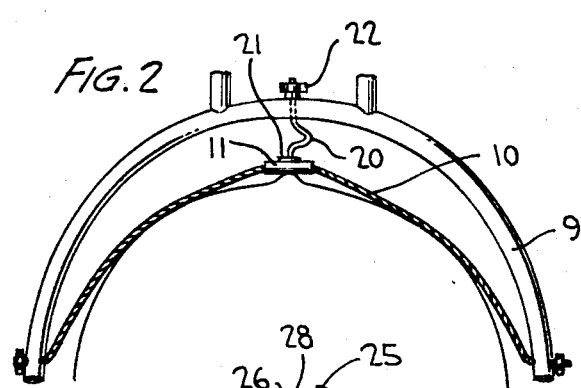
FIG. 2 is a detailed view of the flexible pressure member extending across the back of an animal.

A support cable 20 is attached between the center of the spanning bar 9 and the pipe section 11 so as to support the flexible member 10 when the same is raised to the inoperative position to allow the cow easy ingress and egress in the stall S. This cable 20 may be attached in any suitable manner, such as by use of a collar 21 welded to the pipe section 11, as shown in FIG. 2; and by passing through an aperture in the center of the spanning bar 9 with a cable clamp 22 attached to the end thereof. The pipe section 11 is preferably a tight friction fit on the cable 10 to maintain its centered position. As shown in FIG. 2, the pipe section 11 is straight so that it bears on the apex of the backbone, which in turn will provide discomfort or distress to the animal for the maximum control capability.

Figure 3:
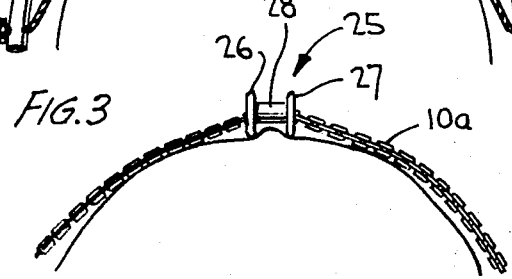
FIG. 3 is a detailed view of another embodiment of the flexible pressure member extending across the back of the animal.

In FIG. 3 is shown an alternative arrangement for providing the improved control capability by applying increased pressure in the region of the backbone. In this embodiment, a spool member 25 is fixedly positioned in the middle of the flexible member 10, which has been shown as a chain 10a in this figure. The spool 25 has raised annular portions 26, 27 at the ends of a tubular body 28 so as to apply increased pressure to the sides of the backbone of the animal by critical spacing of said portions 26, 27 in accordance with the approximate width of the backbone. If the apex of the backbone of an animal is particularly sensitive and avoidance of this point is desired, the annular portions 26, 27 may be of sufficient diameter to serve to support the body 28 of the spool 25 above the apex of the backbone. Conversely, if three-point engagement and increased distress to the animal for better control of an unruly animal is desired, the ends 26, 27 may be gauged so as to also allow engagement at the apex of the backbone.

Figure 4:
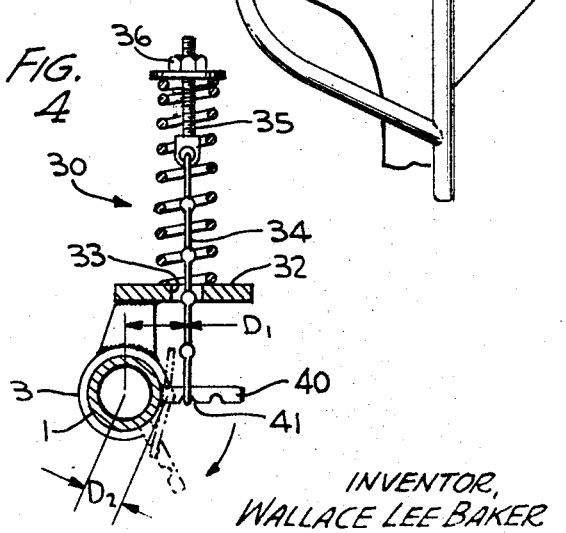
FIG. 4 is a cross-sectional view taken substantially along line 4—4 of FIG. 1 showing the construction of the improved spring assembly.

An improved spring assembly 30 is provided to raise, by counterbalancing, the pressure member assembly B to its uppermost or inoperative position. Thus, upstanding compression spring 31 is suitably mounted on a platform 32 welded to the support of stall S. Passing through aperture 33 (see FIG. 4) is a flexible connecting chain 34 having its upper end attached to a threaded shaft 35. A nut 36 attaches the shaft 35 in an adjustable manner to the top end of the spring.

Extending radially outward from the cross bar 1 adjacent the spring assembly 30 is a lever 40. This lever is provided with notches 41 along the lower edge thereof for positioning of the final chain link therein so as to position the chain 34 spaced from the periphery of the cross bar 1. The force and range of movement may be changed if desired by repositioning the chain 34 in another selected notch 41. When the cross member 1 is rotated in response to movement of the control arm 2 to bring the pressure bar 10 into operative engagement, the effective lever arm of lever 40 is at a maximum distance $D_1$ to increase the effective strength or force of the spring 31 in its original uncompressed state. As the lever 40 is progressively rotated, the chain 34 is brought progressively into peripheral engagement with the cross bar 1 in a complementary fashion to a minimum distance $D_2$ so that the effective lever arm is reduced. However, the strength of the spring 31 is now being progressively increased and the two forces are thus advantageously designed to cancel each other so that the effective spring force throughout the range of movement remains substantially the same. This is important since the operator now does not have to increase the pulling force as the pressure member bar 10 is brought down into engagement with the back of the cow C. The force remains substantially the same for greater ease in operation and better sensitivity in gaining the required pressure to prevent arching of the back.

To summarize the operation of the device of the invention, when the chain 17 is not attached to the hook assembly 19, the spring 31 is effective to hold the pressure member assembly B up in the out-of-the-way position. At this time, the cow C may be moved with ease into the stall S and positioned as required for milking.

The operator then brings the flexible pressure member 10 down into firm engagement with the sway of the back (note FIG. 1) by simply grasping the control arm 2 and moving the same downwardly in an arc against the force of the spring 31. As explained above, as the control arm 2 is being moved downwardly there is no substantial change in the force required to overcome the effect of the spring 31. When the desired pressure has been obtained, the link of the chain 17 adjacent the hook assembly 19 is fixed so as to secure the flexible member 10 in position. Since the flexible member 10 is positively fixed against upward movement at the lower ends of the spanning bar 9, the cow is now incapable of arching her back in order to kick. Because of the flexibility, the member 10 may be positioned over a range to select the most favorable position along the length of the sway of the back. Also, because of the flexibility the bar or cable 10 will move or flex longitudinally with the cow C so as to prevent the cow from attempting to slip the same over the hips or shoulders. The use of the rigid section 11 at the center of the member 10 insures that increased pressure relative to the sides and more effective distress is given to the cow C for better control.

While the device is in the operative position, the pressure member or cable 10 engages the sides of the animal as shown in FIG. 2 in order to prevent side-to-side movement. When the milking operation has been completed, the pressure member assembly B is capable of being quickly released to return under the influence of the spring 31 to the inoperative position of FIG. 1, by simply removing the chain 17 from the hook assembly 19.

From the foregoing description, the favorable and improved results and advantages of the controlling device and the basic method of the present invention should be readily apparent to those skilled in the art. The flexible pressure member 10 is fixed in position with firm pressure against the back of the animal so that it is positively restrained from action which would obstruct the operator's access to it. The ends of the flexible member 10 are positively fixed so that the cow cannot arch its back to kick and no other control pressure is required. The pipe section 11 and the spool 25 positioned at the center of the pressure member 10 afford more effective control to the animal by increasing the pressure at the backbone relative to the sides of the back. The improved spring assembly 30 supports the flexible pressure member 10 in an out-of-the-way position to allow the cow easy ingress and egress from the stall S, and due to the spring force maintenance means the operator is given easier and finer control in bringing the pressure member 10 into operative position.

In this disclosure, there is shown and described only the preferred embodiment of the invention but, as aforementioned, it is to be understood that the invention is capable of various changes or modifications within the scope of the inventive concept as expressed by the accompanying claims.

I claim:
1. An animal restraining device comprising a substantially rigid frame structure, depending substantially rigid support arm means, means for pivotally mounting said support arm means on said structure for adjustable movement about a substantially horizontal axis toward and away from the back of said animal, said support arm means extending down along the sides of the animal and spaced outwardly therefrom, and an elongated, flexible pressure member carried by said arm means by attachment of the ends thereof at the sides of the animal, said member adapted to extend in a substantially horizontal position along the upper sides and laterally across the back of the animal in the operative position, and adjustable means connected to said arm means for fixing said pressure member in position by interaction with said frame structure through said arm means to apply firm controlling pressure to the upper sides and the back of the animal, whereby the flexible pressure member is fixed in position to restrain the animal from arching the back and side-to-side movement yet free to assume the contour of the back of the animal and flex in the longitudinal direction of said animal.

2. The combination of claim 1 wherein said flexible pressure member comprises a cable to provide a localized line of pressure extending across the back.

3. The combination of claim 1 wherein is further provided a substantially rigid pressure section positioned substantially at the center of said flexible member, said pressure section being straight and extended in length to afford engagement with the backbone of the animal and to positively bear on the same when in the operative position to increase the pressure at the backbone relative to the sides of the back.

4. The combination of claim 3 wherein said pressure section includes smooth projecting portions at each end, said portions extending toward the back of said animal and spaced apart so as to engage the sides of the backbone of the animal and increase the pressure on said backbone sides relative to the upper sides of the back.

5. The combination of claim 3 wherein said pressure section is spool shaped having a tubular body and annular ends, said ends being spaced apart so as to engage the sides of the backbone of the animal.

6. The combination of claim 5 wherein said annular members serve to support said tubular body spaced above the backbone of the animal.

7. The combination of claim 1 wherein is further provided a rigid, curved spanning bar attached to said support arm means for positioning in spaced relationship above the back, the ends of said flexible pressure member being attached to the ends of said spanning bar so as to positively fix said flexible pressure member against upward movement.

8. An animal restraining device comprising a substantially rigid frame structure, depending substantially rigid support arm means, means for pivotally mounting said support arm means on said structure for adjustable movement about a substantially horizontal axis toward and away from the back of said animal, and a pressure member carried by said support arm means and adapted to extend in a substantially horizontal position laterally across the back of the animal, adjustable means connected to said support arm means for fixing said pressure member in position to apply firm pressure to the back of the animal, spring means mounted adjacent said pivotally mounting means and interconnected with said support arm means for urging said pressure member upwardly away from the back of said animal, and compensating means connected to said spring means to maintain substantially the same effective spring force throughout the range of movement of said adjustable means, whereby ease of operation and sensitivity in gaining the required pressure is enhanced.

9. The combination of claim 8 wherein is further included substantially rigid cross bar for mounting said support arm means, said compensating means including a lever extending radially outward from said bar, flexible connecting means between said spring and said lever, said flexible means being spaced from said cross bar when said support arm means is in the uppermost raised position and progressively brought toward and eventually into engagement with the periphery of said cross bar upon movement of said adjustable means.

10. The combination of claim 9 wherein said connecting means is attached to said spring means by a threaded shaft and nut combination to afford adjustment of the strength of the same.

11. The combination of claim 9 wherein said spring means comprises a compression spring, said spring being mounted in juxtaposition to said cross bar and said connecting means being substantially positioned within the confines of said spring.

* * * * *